United States Patent
Blank

(10) Patent No.: US 7,198,394 B2
(45) Date of Patent: Apr. 3, 2007

(54) VEHICLE MIRROR SYSTEM WITH LIGHT PIPING ELEMENT

(75) Inventor: Rodney K Blank, Zeeland, MI (US)

(73) Assignee: Donnelly Corporation, Holland, MI (US)

( * ) Notice: Subject to any disclaimer, the term of this patent is extended or adjusted under 35 U.S.C. 154(b) by 43 days.

(21) Appl. No.: 11/190,182

(22) Filed: Jul. 26, 2005

(65) Prior Publication Data

US 2005/0259309 A1 Nov. 24, 2005

Related U.S. Application Data

(63) Continuation of application No. 10/229,573, filed on Aug. 28, 2002, now Pat. No. 7,008,090.

(60) Provisional application No. 60/316,045, filed on Aug. 30, 2001.

(51) Int. Cl.
*B60R 1/12* (2006.01)
(52) U.S. Cl. ............... 362/494; 362/276; 362/551
(58) Field of Classification Search .......... 362/494, 362/276; 551/551
See application file for complete search history.

(56) References Cited

U.S. PATENT DOCUMENTS

| | | | |
|---|---|---|---|
| 4,443,057 A * | 4/1984 | Bauer et al. | 359/606 |
| 4,632,509 A | 12/1986 | Ohmi et al. | 350/283 |
| 5,434,407 A * | 7/1995 | Bauer et al. | 250/227.24 |
| 5,659,423 A | 8/1997 | Schierbeek et al. | 359/604 |
| 6,176,602 B1 | 1/2001 | Pastrick et al. | 362/494 |
| 6,276,821 B1 | 8/2001 | Pastrick et al. | 362/494 |
| 6,416,208 B2 | 7/2002 | Pastrick et al. | 362/494 |
| 6,568,839 B1 | 5/2003 | Pastrick et al. | 362/494 |
| 6,685,348 B2 | 2/2004 | Pastrick et al. | 362/494 |
| 7,008,090 B2 * | 3/2006 | Blank | 362/494 |
| 2003/0043589 A1 | 3/2003 | Blank | 362/494 |
| 2003/0206417 A1 | 11/2003 | Pastrick et al. | 362/494 |
| 2004/0156207 A1 | 8/2004 | Pastrick et al. | 362/487 |

\* cited by examiner

*Primary Examiner*—Sandra O'Shea
*Assistant Examiner*—James W Cranson, Jr.
(74) *Attorney, Agent, or Firm*—Van Dyke, Gardner, Linn & Burkhart, LLP

(57) ABSTRACT

A vehicle rearview mirror system includes a rearview mirror assembly comprising an electro-optic reflective element and, preferably, at least a first and a second photo-sensor, both facing generally in a common direction. The system further includes a light piping element that pipes light to the first photo-sensor from a light environment different from the light environment to which the second photo-sensor is exposed. The first photo-sensor comprises a semiconductor photo-sensor sensitive both to visible light and to infrared radiation. A spectral filter is disposed in front of the first photo-sensor to reduce the amount of infrared radiation incident thereat. The spectral filter preferably comprises at least one of a) a filter element having at least about 60% visible light transmission and having less than about 10% transmission in the near-infrared spectral region; and b) an infrared attenuating dye in a polymer material.

23 Claims, 6 Drawing Sheets

VEHICLE MIRROR SYSTEM WITH LIGHT PIPING ELEMENT

CROSS-REFERENCE TO RELATED APPLICATION

This application is a continuation of U.S. patent application Ser. No. 10/229,573, filed on Aug. 28, 2002 now U.S. Pat. No. 7,008,090, which claims priority from U.S. provisional patent application Ser. No. 60/316,045, filed on Aug. 30, 2001, the disclosures of which are hereby incorporated herein by reference in their entireties.

BACKGROUND OF THE INVENTION

The present invention is directed to a vehicle rearview mirror system and, in particular, to a rearview mirror system incorporating one or more electro-optic reflective elements which automatically dim in response to glare-producing light.

Electro-optic rearview mirror systems include an electro-optic reflective element and an electronic circuit, which controls a reflectance level of the electro-optic reflective element. In order to establish a reflectance level of the electro-optic reflective element, the electronic circuit includes one or more photo-sensors to sense light conditions in a particular light environment. In order to sense the desired light environment, it is common to utilize certain mounting techniques for the light sensors in order to position the light sensors to sense the appropriate light environment. The use of special mounting arrangements for the light sensors increases the cost and difficulty of assembling the electro-optic rearview mirror system.

SUMMARY OF THE INVENTION

The present invention provides a vehicle rearview mirror system which is easier to assemble and thereby less costly to manufacture. Furthermore, the present invention increases the ability of the mirror system to be robotically assembled.

A vehicle rearview mirror system, according to an aspect of the invention, includes a rearview mirror assembly having an electro-optic reflective element, a housing for the reflective element and a control that establishes a reflectance level of the reflective element. The control includes a circuit substrate, such as a printed circuit board, having opposite sides and at least one photo-sensor on a common side of the circuit board. The assembly further includes at least one light conduiting element that is adapted to exposing the at least one photo-sensor to a particular light environment. The at least one photo-sensor may be at least two photo-sensors, and the at least one light conduiting element/light conduiting path may be used to expose one photo-sensor to a different light environment than another or others of the at least two photo-sensors.

These and other objects, advantages and features of this invention will become apparent upon review of the following specification in conjunction with the drawings.

DESCRIPTION OF THE PREFERRED EMBODIMENT

Figure 1:
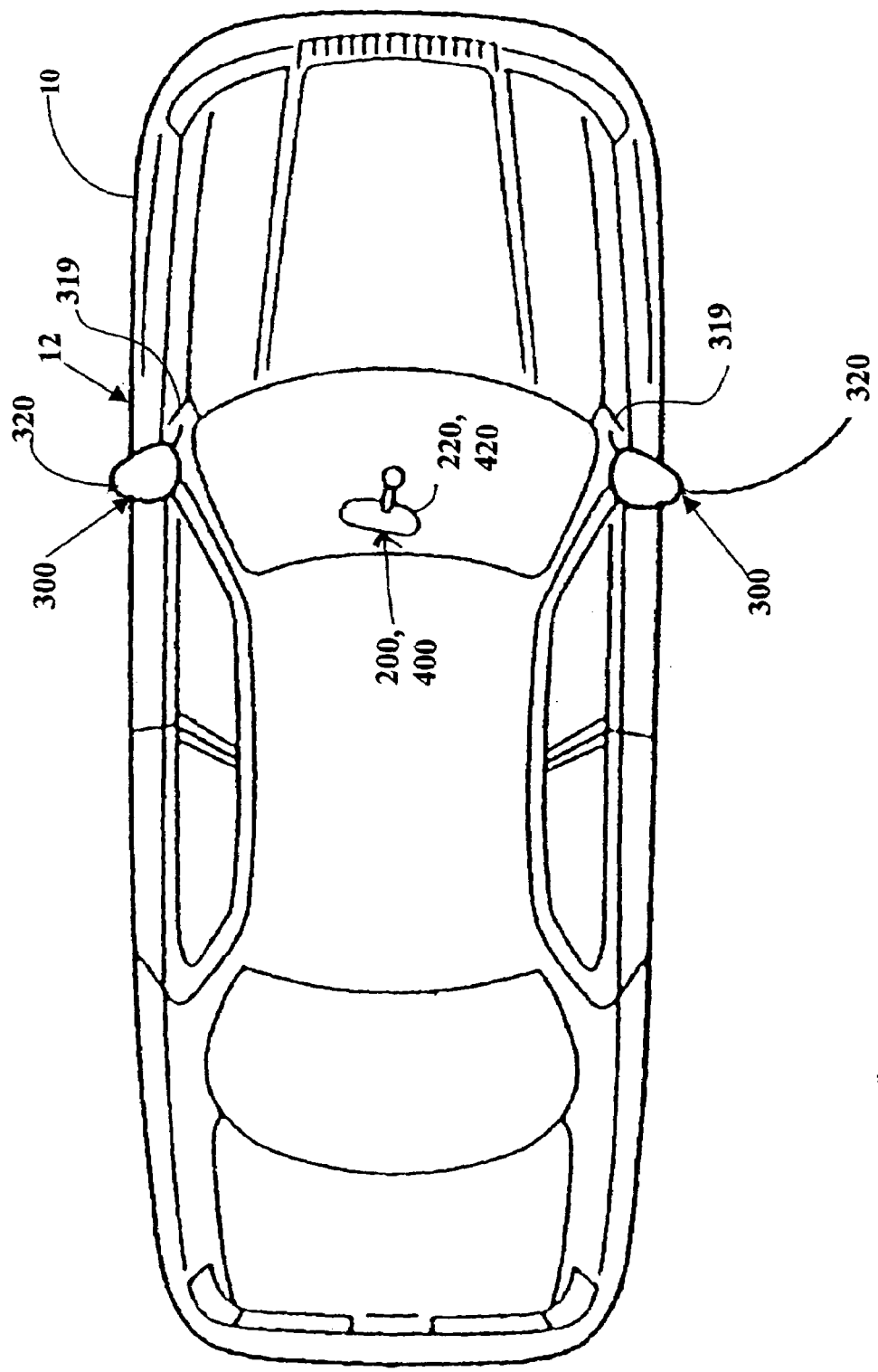
FIG. 1 is a top plan view of a vehicle incorporating a vehicle rearview mirror system, according to the invention.

Referring now specifically to the drawings, and the illustrative embodiments depicted therein, a vehicle 10 incorporating a vehicle rearview mirror system 12 including an interior mirror system 20 having at least one interior rearview mirror assembly 220 and at least one independently dimming exterior mirror system 300 having at least one exterior rearview mirror assembly 320 (FIG. 1). It should be understood that the invention may be applied to only one of mirror assemblies 220, 320 or to two or more of the mirror assemblies.

Figure 2:
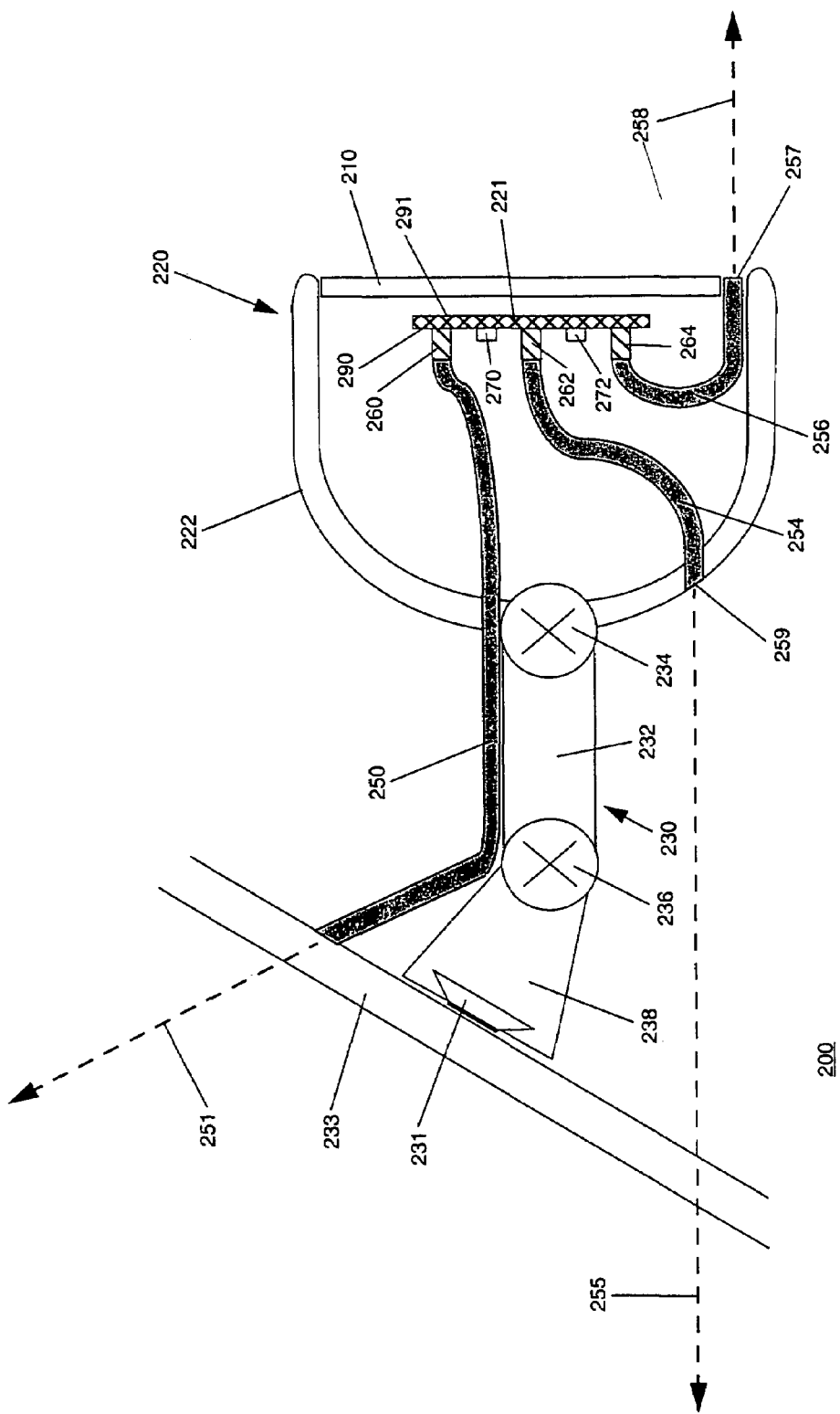
FIG. 2 is a side elevation of an interior rearview mirror system, according to the invention.

Referring to FIG. 2, interior mirror system 200 includes an interior mirror assembly 220 that includes an electro-optic reflective element 210 (preferably an electrochromic mirror element such, as is disclosed in U.S. Pat. Nos. 6,002,51; 6,154,306; 5,668,663 and 5,724,187, the entire disclosures of which are hereby incorporated herein) housed in a mirror housing 222. Housing 222 is pivotally adjustable about mirror support 230 (adapted for attachment to a vehicle windshield or a vehicle header, such as is disclosed in U.S. Pat. Nos. 5,487,522; 5,671,996; 5,820,097; 5,615,857; 5,330,149; 5,100,095; 4,930,742; or 4,936,533 or co-pending U.S. patent application Ser. No. 08/781,408, filed Jan. 10, 1997, all commonly assigned to Donnelly Corporation, the disclosures of which are hereby incorporated herein by reference). Mirror support 230 comprises a double-ball mirror support including pivot or ball joints 234, 236 and a support arm 232. Alternately, a single-ball support (as known in the art) could be used. Support 230 includes mirror mount 238 that attaches to mirror mounting button 231 that is attached to front windshield 233 of the vehicle. Housing 222 houses printed circuit board (PCB) 221 that is disposed in the interior cavity of housing 222 to the rear of reflective element 210 (i.e., closer to windshield 233 than the location of reflective element 210). Printed circuit board 221 has a rear surface 290 closest to front windshield 233 and an opposing surface 291 closer than surface 290 to reflective element 210 (and farther from windshield 233).

Arranged on surface 290 of PCB 221 are a plurality of photo-sensors comprising photo-sensor 260 that is adapted to be part of a headlamp control circuit, such as an automatic headlamp dimming system (such as disclosed in U.S. Pat. Nos. 5,715,093 and 5,812,321, the entire disclosures of which are hereby incorporated by reference herein); photo-sensor 262 that is adapted to be a forward-detecting (i.e., facing in the direction of travel of the vehicle when driving) ambient sensor for use in the electronic circuitry (also included on PCB 221) used to electrically vary the reflectance level of reflective element 210 (such as disclosed in U.S. Pat. Nos. 5,715,093 and 5,812,321, the entire disclosures of which are hereby incorporated by reference herein); and photo-sensor 264 that is adapted to be a rearward-detecting (i.e., detecting light incident from the direction of travel of the vehicle when driving) glare sensor (that detects glare from headlights of vehicles approaching from the rear of the vehicle) for use in the electronic circuitry (also included on PCB 221) used to electrically vary the reflectance level of reflective element 210 (such as disclosed in U.S. Pat. Nos. 4,886,960; 4,917,477; 5,204,778; 6,130,448; 5,434,407; 4,799,768; 4,793,690; 5,193,029, the entire disclosures of which are hereby incorporated by reference herein).

Headlamp-controlling photo-sensor 260 views through windshield 233 via a light-conduiting member 250 (that comprises, for example, an acrylic light pipe). Preferably, light-conduiting member 250 is configured so as to have a skyward field of view 251. Ambient light-detecting photo-sensor 262 views via a light-conduiting member 254 (that comprises, for example, an acrylic light pipe) that views through an aperture 259 in mirror housing 222. Preferably, light-conduiting member 254 is configured so as to have a generally horizontal (i.e., parallel to the road upon which the vehicle travels) field of view 255. Glare light-detecting photo-sensor 264 views to the rear of the vehicle (typically via a rear window, not shown) via a light-conduiting member 256 (that comprises, for example, an acrylic light pipe) that views through an aperture 257 in a bezel portion of mirror housing 222. Preferably, light-conduiting member 256 is configured so as to have a generally horizontal (i.e., parallel to the road upon which the vehicle travels) field of view 258.

Thus, interior mirror assembly 220 includes three photo-sensors 260, 262, 264 mounted to circuit board 221, and preferably to one surface 290 of circuit board 221. Interior mirror assembly 220 further preferably includes a plurality of light pipes or fiber-optic cables for differentially exposing at least one light sensor of a plurality to a different light environment than another light sensor(s) of that plurality. Included in interior mirror 220, preferably, may be in a circuit which controls the activated state of the vehicle headlight system in order to switch the vehicle headlights between a nighttime condition and a daytime condition which may be between an ON and OFF state or between a daytime running light state and a full night state. Light pipes 254, 256 may allow photo-sensors 262, 264 to be in a light environment of ambient light conditions or glaring light conditions, respectfully, without the necessity of, for example, mounting photo-sensors 262, 264 to housing 222 where they may receive light forward and rearward, respectfully, of the vehicle.

In FIG. 2, photo-sensors 264 and 262 are respective glare and ambient light sensors, which are utilized to establish a reflectance level of reflective element 210. In the illustrative embodiment, photo-sensors 260, 262 and 264 are mounted to a common side 290 of circuit board 221. However, any or all of photo-sensors 260, 262 and 264 could be positioned on the opposing side 291 of circuit board 221. Regardless of what side they are mounted on, light-conduiting members 250, 254, 256 expose each of the sensors 260, 262, 264 to a different environment than the environment of the other sensors. Photo-sensors 260, 262, 264 may be photo-transistors, photo-diodes, photo-resistors, multi-pixel sensors, CMOS photo-sensors, or the like.

Advantageously, an electronics manufacturer can build a standard circuit board and populate it with at least two photo-sensors (and sometimes, when headlamp control such a twilight sentinel or the like is desired, with at least three photo-sensors), and preferably with all two or all three (at least) photo-sensors being mounted on the same side (i.e., a common side) of the circuit substrate (such as a printed circuit board) used, and so enhance ease and economy of manufacture. Light piping can then be used to direct light to the designated photo-sensor upon mounting the PCB into a mirror housing, as shown in FIG. 2. Advantageously for automatic dimming electrochromic variable reflectivity interior mirror assemblies, both the ambient detecting photo-sensor and the glare-detecting photo-sensor can be mounted on the same side of the PCB (and not on different, opposing sides of the PCB as is conventional), and with light piping being used to pipe light to these common-side-mounted photo-sensors, and with one light pipe being adapted to conduit light incident from the front of the vehicle (i.e., forward incident light) to the ambient detecting photo-sensor and another light pipe being adapted to conduit light incident from the rear of the vehicle (i.e., rear incident light) to the glare-detecting photo-sensor. Thus, light piping is used in the present invention to pipe light incident from different directions to two photo-sensors that are facing and are directed in a common, same direction and that, preferably, are similarly mounted/orientated on the same side of a printed circuit board.

Note in FIG. 2 that side 290 of PCB 221 is populated with circuitry 270, 272 that, preferably, includes circuit elements at least for control of the reflectivity level of variable reflectance electro-optic element 210.

Figure 3:
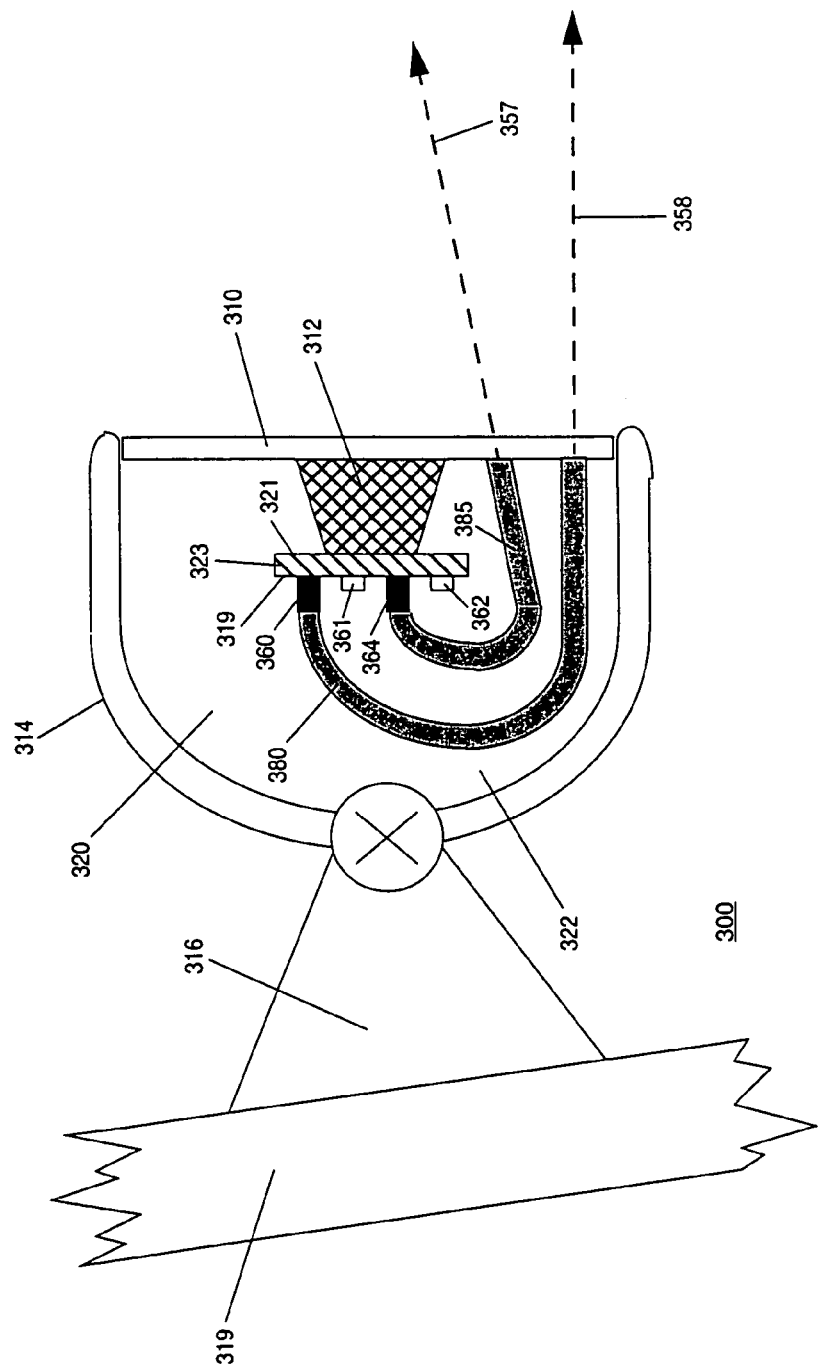
FIG. 3 is a side elevation of an exterior rearview mirror system, according to the invention.

FIG. 3 shows an improved independently dimming exterior mirror system 300 of this present invention. Independently dimming exterior mirror systems are known, such as are disclosed in U.S. Pat. No. 5,659,423, the entire disclosure of which is hereby incorporated by reference herein. System 300 includes exterior mirror assembly 320 that attaches to vehicle body exterior 319 (typically to a front door portion or front pillar portion close to or across from the seating location of the vehicle driver). Exterior mirror assembly 320 is preferably a breakaway assembly comprising a fixed portion 316 adapted for attachment to body 319, and a movable portion 322 that preferably is movable about breakaway joint 318. Casing 314 of portion 322 includes electro-optic (preferably, electrochromic) reflective element 310 that is mounted to, and is adjustable by, actuator 312 (that preferably comprises an electrically-operated actuator, such as is disclosed in U.S. Pat. Nos. 5,371,659; 5,497,305 and 6,149,287, the entire disclosures of which are hereby incorporated herein) in order to position the rearward field of view of reflective element 310 to suit a driver's needs. Mounted to actuator 312 is circuit substrate 323, such as a printed circuit board that has one side 319 that faces away from reflective element 310 and an opposing side 321 that faces towards reflective element 310. Circuitry elements 361, 362 are mounted on side 319 of circuit substrate 323, and are operable at least to control a reflectance state of variable reflectance element 310. Photo-sensors 360, 364 are also mounted on side 319 of circuit substrate 323, and preferably are arranged to face in generally the same direction and generally the same orientation. Light-conduiting member 380 (for example, an acrylic light pipe element) at one end couples with/directs light to photo-sensor 360 (that functions as the glare-detecting sensor for the circuitry controlling the reflectivity of element 310) and is adapted to view rearwardly to the rear of the vehicle to which assembly 320 is mounted in a generally horizontal (i.e., parallel to the road surface) direction 358. Light-conduiting member 385 (for example, an acrylic light pipe element) at one end couples with/directs light to photo-sensor 364 (that serves as the ambient light detecting sensor for the circuitry controlling the reflectivity of element 310) and is adapted to view rearwardly to the rear of the vehicle to which assembly 320 is mounted in a generally non-horizontal (i.e., not parallel to the road surface) direction that is different from direction 358, and preferably in a skyward direction 357. Thus, in this improved system, the two photo-sensors used are mounted on the same side/common side of a PCB, and with both photo-sensors facing in generally the same direction and with generally the same orientation, and light piping is used to pipe light to the each from a direction and/or orientation different for that of the photo-sensors.

Thus, and as seen in FIG. 3, photo-sensors 360, 364 are used in a circuit to establish a reflectance level of reflective element 310, and are mounted on a common side of circuit board 323 and are interconnected by a plurality of light pipes 380, 385 in order to expose photo-sensors 360, 364 to different light environments. This allows exterior rearview mirror system 300 to better utilize the invention disclosed in commonly assigned U.S. Pat. No. 5,659,423, the disclosure of which is hereby incorporated herein by reference.

Note that other locations and/or orientations for circuit substrate 323 in mirror assembly 320 are possible, such as are disclosed in U.S. Pat. No. 6,019,475, the entire disclosure of which is hereby incorporated by reference herein.

Figure 4:
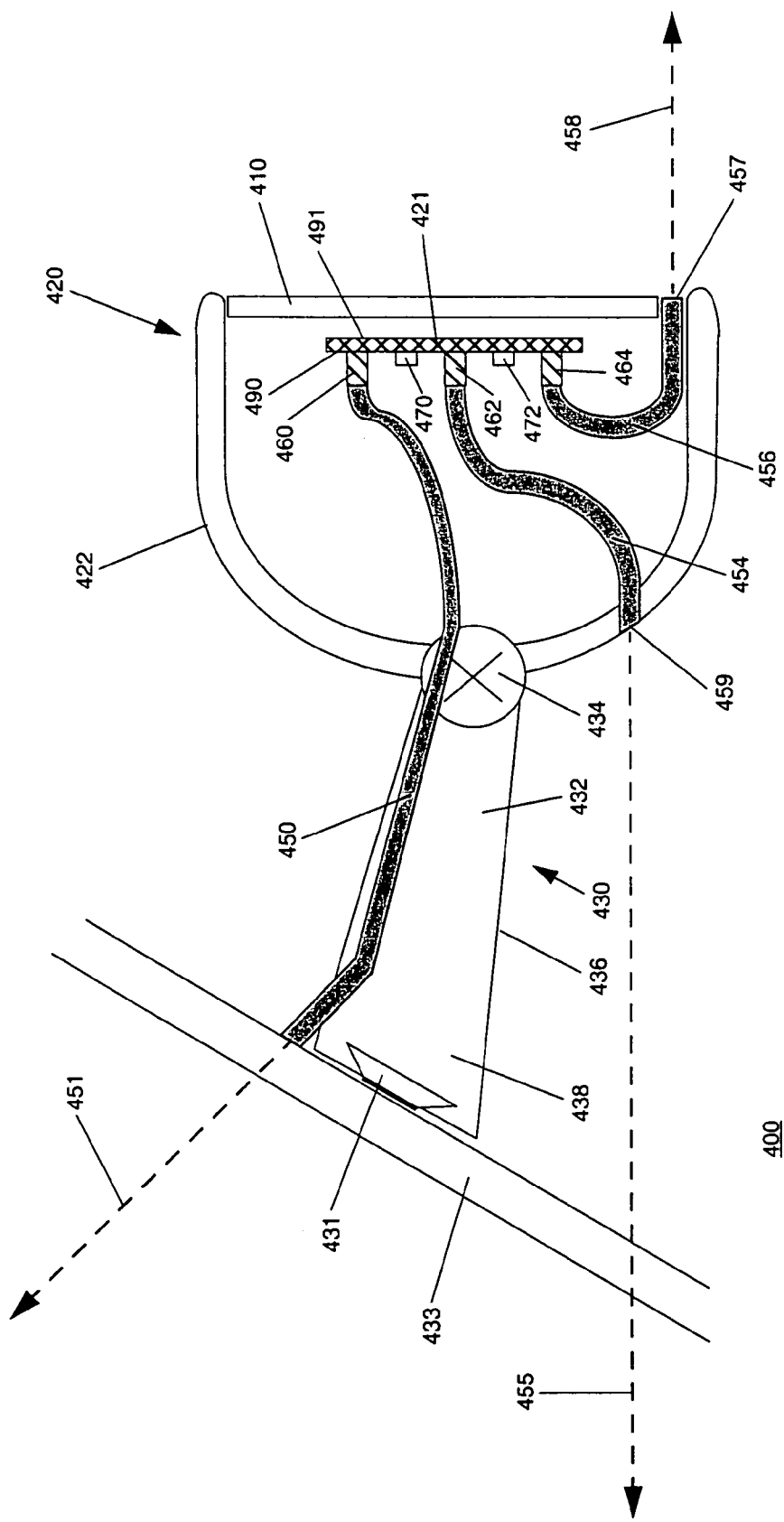
FIG. 4 is the same view as FIG. 2 of an alternative embodiment thereof.

Referring to FIG. 4, interior mirror system 400 includes an interior mirror assembly 420 that includes an electro-optic reflective element 410 (preferably an electrochromic mirror element, such as is disclosed in U.S. Pat. Nos. 6,002,51; 6,154,306; 5,668,663 and 5,724,187, the entire disclosures of which are hereby incorporated herein) housed in a mirror housing 422.

Housing 422 is pivotally adjustable about mirror support 430. Mirror support 430 comprises a single-ball mirror support including pivot or ball joint 434 and a support arm or bracket element 432. Support 430 attaches (and preferably attaches via a break-away mounting, as known in the automotive mirror art) to mirror mounting button 431 that is attached to front windshield 433 of the vehicle. Alternately, bracket 430 can attach to the header region above the front windshield of the vehicle to form a header mount, as known in the automotive mirror art. Housing 422 houses printed circuit board (PCB) 421 that is disposed in the interior cavity of housing 422 to the rear of reflective element 410 (i.e., closer to windshield 433 than the location of reflective element 410). Printed circuit board 421 has a rear surface 490 closest to front windshield 433 and an opposing surface 491 closer than surface 490 to reflective element 410 (and farther from windshield 433). Arranged on surface 490 of PCB 421 are a plurality of photo-sensors comprising photo-sensor 460 that is adapted to be part of a headlamp control circuit, such as an automatic headlamp dimming system (such as disclosed in U.S. Pat. Nos. 5,715,093 and 5,812, 321, the entire disclosures of which are hereby incorporated by reference herein); photo-sensor 462 that is adapted to be a forward-detecting (i.e., facing in the direction of travel of the vehicle when driving) ambient sensor for use in the electronic circuitry (also included on PCB 421) used to electrically vary the reflectance level of reflective element 410 (such as disclosed in U.S. Pat. Nos. 5,715,093 and 5,812,321, the entire disclosures of which are hereby incorporated by reference herein); and photo-sensor 464 that is adapted to be a rearward-detecting (i.e., detecting light passing through a rear window and incident upon the front surface of the reflective element from the direction of travel of the vehicle when driving) glare sensor (that detects glare from headlights of vehicles approaching from the rear of the vehicle) for use in the electronic circuitry (also included on PCB 421) used to electrically vary the reflectance level of reflective element 410 (such as disclosed in U.S. Pat. Nos. 4,886,960; 4,917,477; 5,204,778; 6,130,448; 5,434,407; 4,799,768; 4,793,690; 5,193,029, the entire disclosures of which are hereby incorporated by reference herein).

Headlamp-controlling photo-sensor 460 views through windshield 433 via a light-conduiting member 450 (that comprises, for example, an acrylic light pipe). Preferably, light-conduiting member 450 is configured so as to have a skyward field of view 451. Also, and preferably, light-conduiting member 450 passes through an interior portion 438 of support or bracket 430 so as to be at least partially, and preferably substantially, hidden from view by a wall structure of bracket 430. Light-conduiting member 450 can be adapted to pass through pivot joint 434 (such as by passing through a wire-way or channel therein) or can pass around pivot joint 434. Optionally, a light-conduiting member connector can be provided in assembly 420 (such as at or on housing 422 or within the cavity formed by the walls of housing 422 or at or on PCB 421) to allow releasable connection and optical coupling of light-conduiting member 450 to photo-sensor 460. Similarly, releasable connectors can be provided for other light pipes in the assembly. The portion of light-conduiting member 450 at windshield 433 that is adapted, preferably, to view skyward so as to detect ambient lighting levels (in order to make a determination as to whether to turn on or off a headlights at dusk or dawn, or the like) may view through windshield 433 via an external portion of bracket 430, as shown in FIG. 4, or can view through an internal or integral portion of bracket 430 (such as at or adjacent to mirror button 431) and whereby the structure of bracket 430 provides support for light-conduiting member 450 and defines the orientation of its forward field of view (preferably skyward). Note also that photo-sensor 460 can comprise a smart headlamp controller comprising an imaging device, such as a CCD or CMOS multi-pixel camera, such as is disclosed in U.S. Pat. Nos. 5,796,094 and 6,097,023 which are commonly assigned with the present application to Donnelly Corporation, the entire disclosures of which are hereby incorporated by reference herein. Ambient light detecting photo-sensor 462 views via a light-conduiting member 454 (that comprises, for example, an acrylic light pipe) that views through an aperture 459 in mirror housing 422. Preferably, light-conduiting member 454 is configured so as to have a generally horizontal (i.e., parallel to the road upon which the vehicle travels) field of view 455. Glare light-detecting photo-sensor 464 views to the rear of the vehicle (typically via a rear window, not shown) via a light-conduiting member 456 (that comprises, for example, an acrylic light pipe) that views through an aperture 457 in a bezel portion of mirror housing 422. Preferably, light-conduiting member 456 is configured so as to have a generally horizontal (i.e., parallel to the road upon which the vehicle travels) field of view 458.

The present invention allows the electronics components including photo-sensors to be mounted on a printed circuit board utilizing standard assembly methods. This preferably includes allowing the electronics to be mounted on a same side of a circuit board. Furthermore, the use of light pipes minimizes the exposure of the photo-sensors to ultraviolet rays. Advantageously, the present invention eliminates the requirements that any electronics be included outside of the mirror housing (as is conventional in some skyward-facing headlamp controllers, such as disclosed in U.S. Pat. Nos. 5,666,028; 5,998,929 and 5,537,003, the entire disclosures of which are hereby incorporated by reference herein). Advantageously, the light pipe replaces any external-to-the-mirror-housing photo-sensor holder, thereby minimizing the cost of the assembly. Furthermore, the light pipe improves the robustness of the system.

The invention may be utilized with photo-sensors that are in a circuit to establish a reflectance level of one or more reflective elements, and may be utilized in a headlight activation system to control the activation state of the headlights or for other applications in which photo-sensors are utilized. Although individual interior rearview mirror assemblies and exterior rearview mirror assemblies are illustrated, it should be understood that the interior and exterior reflective elements may be combined in a unitary system in which photo-sensors positioned at one of the assemblies may be utilized to establish reflective elements for all of the assemblies. This may be accomplished by utilizing a vehicle network, such as disclosed in commonly assigned U.S. Pat. Nos. 5,959,367 and 5,798,575; and in U.S. patent application Ser. No. 09/341,450, filed Jul. 8, 1999, by Drummond et al. for a VEHICLE REARVIEW MIRROR SYSTEM AND A VEHICLE CONTROL INCORPORATING SUCH MIRROR, the disclosures of which are hereby incorporated herein by reference.

Figure 5:
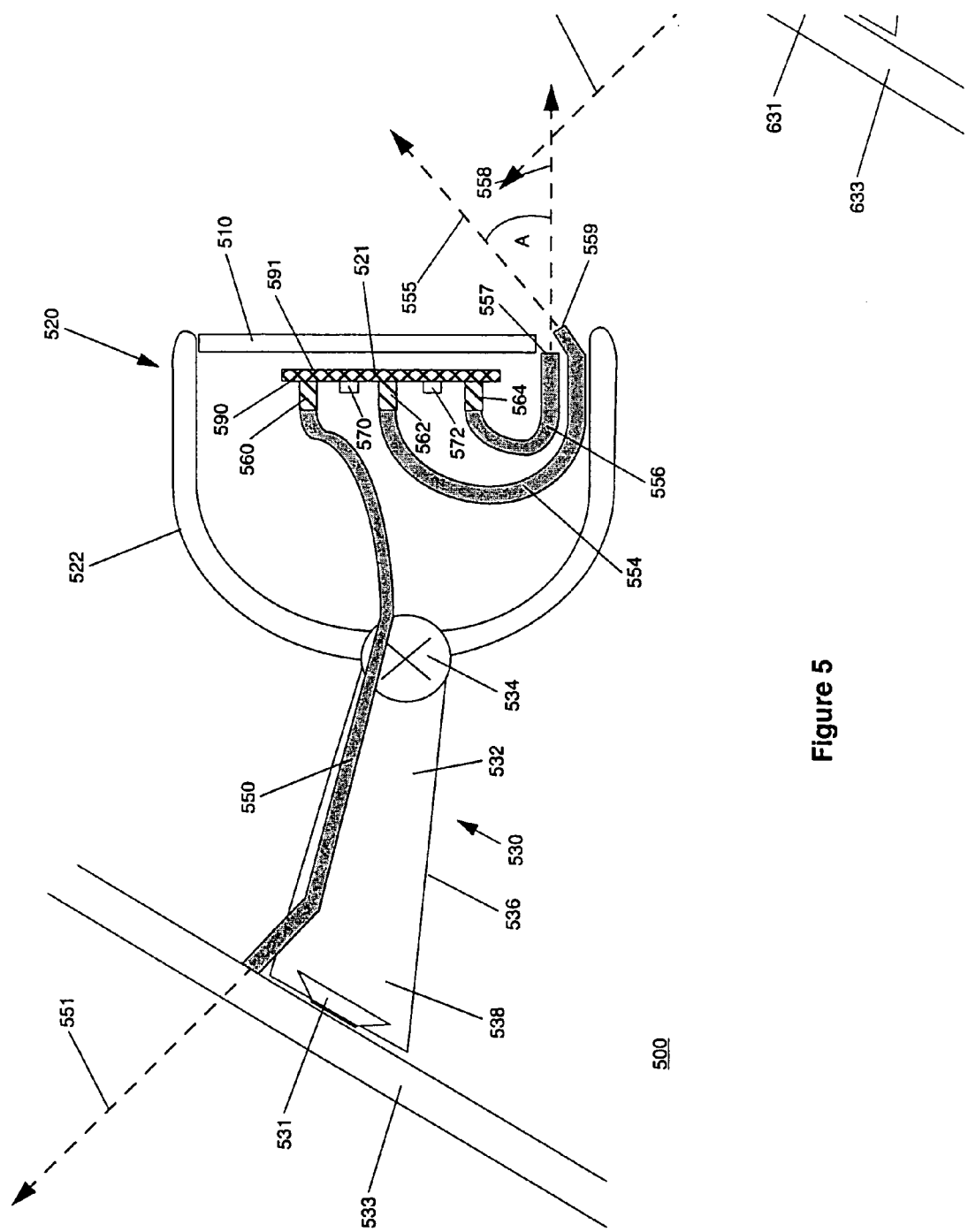
FIG. 5 is a side elevation of another interior rearview mirror system, according to the invention.

Referring to FIG. 5, interior mirror system 500 includes an interior mirror assembly 520 that includes an electro-optic reflective element 510 (preferably an electrochromic mirror element, such as is disclosed in U.S. Pat. Nos. 6,002,51; 6,154,306; 5,668,663 and 5,724,187, the entire disclosures of which are hereby incorporated herein) housed in a mirror housing 522.

Housing 522 is pivotally adjustable about mirror support 530. Mirror support 530 comprises a single-ball mirror support including pivot or ball joint 534 and a support arm or bracket element 532 (alternately, a double-ball mirror support, as known in the automotive mirror art, can be used). Support 530 attaches (and preferably attaches via a break-away mounting, as known in the automotive mirror art) to mirror mounting button 531 that is attached to front windshield 533 of the vehicle. Alternately, bracket 530 can attach to the header region above the front windshield of the vehicle to form a header mount, as known in the automotive mirror art. Housing 522 houses printed circuit board (PCB) 521 that is disposed in the interior cavity of housing 522 to the rear of reflective element 510 (i.e., closer to windshield 533 than the location of reflective element 510). Printed circuit board 521 has a rear surface 590 closest to front windshield 533 and an opposing surface 591 closer than surface 590 to reflective element 510 (and farther from windshield 533). Arranged on surface 590 of PCB 521 is a plurality of photo-sensors comprising photo-sensor 560 that is adapted to be part of a headlamp control circuit, such as an automatic headlamp dimming system (such as disclosed in U.S. Pat. Nos. 5,715,093 and 5,812,321, the entire disclosures of which are hereby incorporated by reference herein); photo-sensor 562 [that is mounted so that its photo-sensing element (for example, a photo-transistor or a photo-diode junction on a silicon substrate such as a silicon wafer/chip or the like or a photo-resistor element such as a thick-film paste of cadmium sulfide on a suitable substrate) is facing towards windshield 533 and away from reflective element 510] is adapted to be an ambient light sensor for use in the electronic circuitry (also included on PCB 521) used to electrically vary the reflectance level of reflective element 510 (such as disclosed in U.S. Pat. Nos. 5,715,093 and 5,812,321, the entire disclosures of which are hereby incorporated by reference herein) by means of light guide/light pipe element 554; and photo-sensor 564 that is adapted to be a rearward-detecting (i.e., detecting light that passes through the rear window and that is incident on the mirror reflective element) glare sensor (that detects glare from headlights of vehicles approaching from the rear of the vehicle) for use in the electronic circuitry (also included on PCB 521) used to electrically vary the reflectance level of reflective element 510 (such as disclosed in U.S. Pat. Nos. 4,886,960; 4,917,477; 5,204,778; 6,130,448; 5,434,407; 4,799,768; 4,793,690; 5,193,029, the entire disclosures of which are hereby incorporated by reference herein).

Headlamp-controlling photo-sensor 560 views through windshield 533 via a light-conduiting member or element 550 (that comprises, for example, an acrylic light pipe or an acrylic or similar optical plastic light conduiting pathway). Preferably, light-conduiting member 550 is configured so as to have a skyward field of view 551. Also, and preferably, light-conduiting member 550 passes through an interior portion 538 of support or bracket 530 so as to be at least partially, and preferably substantially, hidden from view by a wall structure of bracket 530. Light-conduiting member 550 can be adapted to pass through pivot joint 534 (such as by passing through a wire-way or channel therein) or can pass around pivot joint 534. Optionally, a light-conduiting member connector can be provided in assembly 520 (such as at or on housing 522 or within the cavity formed by the walls of housing 522 or at or on PCB 521) to allow releasable connection and optical coupling of light-conduiting member 550 to photo-sensor 560. Similarly, releasable connectors can be provided for other light pipes in the assembly. The portion of light-conduiting member 550 at windshield 533 that is adapted, preferably, to view skyward so as to detect ambient lighting levels (in order to make a determination as to whether to turn on or off headlights at dusk or dawn, or the like) may view through windshield 533 via an external portion of bracket 530, as shown in FIG. 5, or can view through an internal or integral portion of bracket 530 (such as at or adjacent to mirror button 531) and whereby the structure of bracket 530 provides support for light-conduiting member 550 and defines the orientation of its forward field of view (preferably skyward). Note also that photo-sensor 560 can comprise a smart headlamp controller comprising an imaging device, such as a CCD or CMOS multi-pixel camera, such as is disclosed in U.S. Pat. Nos. 5,796,094 and 6,097,023, which are commonly assigned with the present application to Donnelly Corporation, the entire disclosures of which are hereby incorporated by reference herein.

Ambient light detecting photo-sensor 562 views via a light-conduiting member 554 (that comprises, for example, an acrylic light pipe or an acrylic or similar optical plastic light conduiting pathway or element) that views via terminal portion 559 towards the interior cabin roof of the vehicle out of mirror housing 522. Preferably, light-conduiting member 554 is configured so as to have a generally non-horizontal (i.e., upward towards the interior cabin roof or downwards towards the interior cabin floor) field of view 555. Alternately, field of view 555 of ambient sensor 562 can be sideways out of mirror housing 522 towards a side door. Glare light-detecting photo-sensor 564 views to the rear of the vehicle (typically via a rear window, not shown) via a light-conduiting member 556 (that comprises, for example, an acrylic light pipe or an acrylic or similar optical plastic light conduiting pathway or element) that views through an aperture 557 in a bezel portion of mirror housing 522. Preferably, light-conduiting member 556 is configured so as to have a generally horizontal (i.e., parallel to the road upon which the vehicle travels) field of view 558, and with field of view 558 being different from field of view 555 (and, thus, photo-sensor 564 is more responsive to glare from headlamps of rear-approaching vehicles than is photo-sensor 562). The angle A between field of view 558 and field of view 555 is preferably at least 10 degrees; more preferably at least 15 degrees; and most preferably at least 25 degrees.

Figure 6:
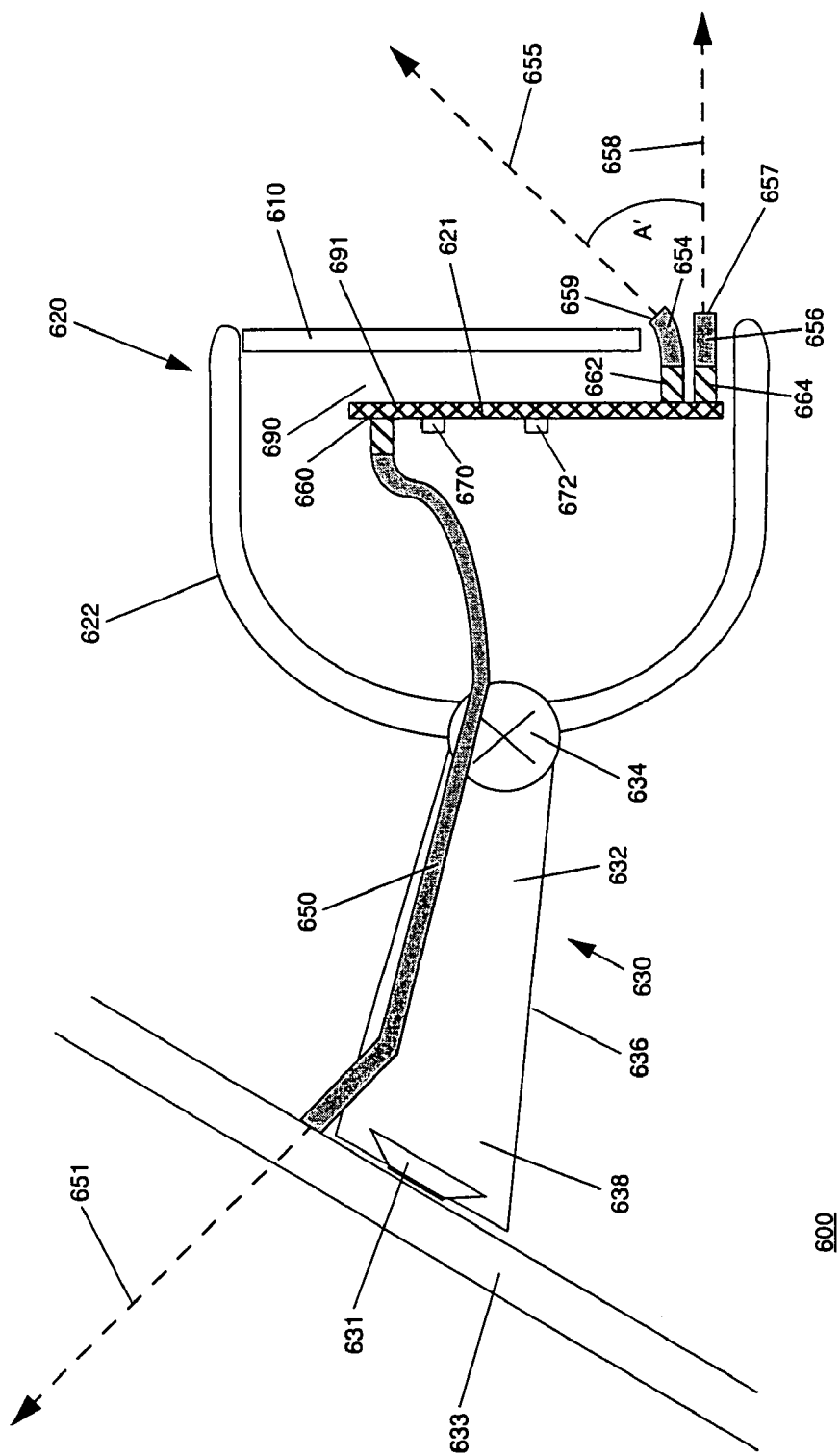
FIG. 6 is a side elevation of another interior rearview mirror system, according to the invention.

Referring to FIG. 6, interior mirror system 600 includes an interior mirror assembly 620 that includes an electro-optic reflective element 610 (preferably an electrochromic mirror element, such as is disclosed in U.S. Pat. Nos. 6,002,51; 6,154,306; 5,668,663 and 5,724,187, the entire disclosures of which are hereby incorporated herein) housed in a mirror housing 622.

Housing 622 is pivotally adjustable about mirror support 630. Mirror support 630 comprises a single-ball mirror support including pivot or ball joint 634 and a support arm or bracket element 632. Support 630 attaches (and preferably attaches via a break-away mounting, as known in the automotive mirror art) to mirror mounting button 631 that is attached to front windshield 633 of the vehicle. Alternately, bracket 630 can attach to the header region above the front windshield of the vehicle to form a header mount, as known in the automotive mirror art. Housing 622 houses printed circuit board (PCB) 621 that is disposed in the interior cavity of housing 622 to the rear of reflective element 610 (i.e., closer to windshield 633 than the location of reflective element 610). Printed circuit board 621 has a rear surface 690 closest to front windshield 633 and an opposing surface 691 closer than surface 690 to reflective element 610 (and farther from windshield 633). Arranged on surface 691 of PCB 621 are a plurality of photo-sensors comprising photo-sensor 662 that is adapted to be a rearward-detecting (i.e., facing in the direction opposite to the direction of travel of the vehicle when driving) ambient sensor for use in the electronic circuitry (also included on PCB 621) used to electrically vary the reflectance level of reflective element 610 (such as disclosed in U.S. Pat. Nos. 5,715,093 and 5,812,321, the entire disclosures of which are hereby incorporated by reference herein); and photo-sensor 664 that is adapted to be a rearward-detecting glare sensor (that detects glare from headlights of vehicles approaching from the rear of the vehicle) for use in the electronic circuitry (also included on PCB 621) used to electrically vary the reflectance level of reflective element 610 (such as disclosed in U.S. Pat. Nos. 4,886,960; 4,917,477; 5,204,778; 6,130,448; 5,434,407; 4,799,768; 4,793,690; 5,193,029, the entire disclosures of which are hereby incorporated by reference herein).

Ambient light-detecting photo-sensor 662 views via a light-conduiting member 654 (that comprises, for example, an acrylic light pipe or an acrylic or similar optical plastic light conduiting pathway or element) that views towards the interior cabin roof of the vehicle at location 659 in mirror housing 622. Preferably, light-conduiting member 654 is configured so as to have a generally non-horizontal (i.e., upward towards the interior cabin roof or downward towards the interior cabin floor) field of view 655. Alternately, field of view 655 of ambient sensor 662 can be sideways out of mirror housing 622 towards a side door. Glare light-detecting photo-sensor 664 views to the rear of the vehicle (typically via a rear window, not shown) via a light-conduiting member 656 (that comprises, for example, an acrylic light pipe or an acrylic or similar optical plastic light conduiting pathway or element) that views through an aperture 657 in a bezel portion of mirror housing 622. Preferably, light-conduiting member 656 is configured so as to have a generally horizontal (i.e., parallel to the road upon which the vehicle travels) field of view 658, and with field of view 658 being different from field of view 655 (and, thus, photo-sensor 664 is more responsive to glare from headlamps of rear-approaching vehicles than is photo-sensor 662). The angle A' between field of view 658 and field of view 655 is preferably at least 10 degrees; more preferably at least 15 degrees; and most preferably at least 25 degrees. Note that photo-sensors 662 and 664 can be placed on PCB 621 using normal electronic component mounting manufacturing, and the light conduiting means can be used to direct incident light thereto.

Note that any one of the photo-sensors can be a photo-transistor or a photo-diode. Such photo-sensors are sensitive both to visible light and to near and far infrared electromagnetic radiation. Thus, and as disclosed in U.S. Pat. No. 4,799,768 (the entire disclosure of which is hereby incorporated by reference herein), it is desirable to use a spectral filter to reduce the amount of infrared radiation incident on a photo-transistor or a photo-diode or a similar semiconductor photo-sensor. For example, a (preferably, polymeric) dichroic filter having a high extinction band in the about 660 nm to about 1100 nm range can be placed in front of a semiconductor photo-sensor (such as the photo-sensor disclosed in U.S. Pat. No. 6,359,274, the entire disclosure of which is hereby incorporated by reference herein). Preferably, such spectral filters have at least about 60% visible light transmission (at least about 70% more preferred and at least about 80% most preferred) and have less than about 10% transmission in the near-infrared spectral region (less than about 5% more preferred and less than about 3% most preferred). Such a filter is available from 3M™ of St. Paul, Minn. under the trade name 3M™ Photonic Products Dichroic Filter Film DFA-64-113, and has a >70% visible light transmission from about 400 nm to about 650 nm, and less than about 10% light transmission in the near-infrared region from about 650 nm to about 1100 nm, or thereabouts. Such a spectral filter comprises multi-layer polymer films comprising a plurality of alternating polymer layers such as are disclosed in U.S. Pat. No. 6,368,699, the entire disclosure of which is hereby incorporated by reference herein. Also, near infrared absorbing filters can be formed by incorporation (such as by casting, molding, mixing, and the like) of near infrared dyes into a polymer structure such as into polycarbonate or polystyrene or acrylic or polyester or acrylate or CR39 or a COC polyolefin or another similar optical polymer. For example, EPOLIGHT near infrared absorbing dyes available from Epolin Inc. of Newark, N.J. can be used such as Epolin Class III–IV Dyes such as Epolin 2057 or Epolin 1117 or Epolin 2189 or Epolin 2062 or Epolin 2060. Such dyes typically comprise metal inorganic materials such as nickel complexes and the like. In this regard, such infrared absorbing dyes may be included in the light conduiting members described above so as to reduce infrared transmission though the light conduits/light pipes to a semiconductor photo-sensor such as a photo-transistor or a photo-diode. Such infrared attenuating dyes may be included in any light-transmitting lenses/apertures/EMC shields and the like disposed in front of such semiconductor photo-sensors.

Also, in reference, for example, to FIG. 6, a unitary light conduit/light guide can be formed of polycarbonate or acrylic (and preferably, should photo-sensors 662 and 664 be semiconductor photo-sensors such as photo-diodes or photo-transistors, with infrared absorbing dyes included in the plastic polymeric material so that the light conduiting member is a light guide/light pipe that is substantially transmitting to visible light but that is attenuating to radiation above 600–700 nm or so, such as near-IR radiation). Use of polymeric filter materials such as the 3M™ material above (that optionally is moldable to a form such as a lens or cover or the like) and/or use of the infrared attenuating dyes may be used in conjunction with an independently dimming exterior electro-optic mirror system, such as is disclosed in U.S. Pat. No. 5,659,423, the entire disclosure of which is hereby incorporated by reference herein, or with an interior electro-optic mirror system, such as disclosed in Irish Patent Application No: S2002/0314 filed Apr. 26, 2002, to Donnelly Mirrors Limited and in Irish Patent Application No: S2002/0545 filed Jul. 1, 2002, to Donnelly Mirrors Limited, the entire disclosures of which are hereby incorporated by reference herein.

The present invention allows the electronics components including photo-sensors to be mounted on a printed circuit board utilizing standard assembly methods. This preferably includes allowing the electronics to be mounted on a same side of a circuit board. Furthermore, the use of light pipes minimizes the exposure of the photo-sensors to ultraviolet rays. Advantageously, the present invention eliminates the requirements that any electronics be included outside of the mirror housing (as is conventional in some skyward-facing headlamp controllers, such as disclosed in U.S. Pat. Nos. 5,666,028; 5,998,929 and 5,537,003, the entire disclosures of which are hereby incorporated by reference herein). Advantageously, the light pipe replaces any external-to-the-mirror-housing photo-sensor holder, thereby minimizing the cost of the assembly. Furthermore, the light pipe improves the robustness of the system.

The invention may be utilized with photo-sensors that are in a circuit to establish a reflectance level of one or more reflective elements, and may be utilized in a headlight activation system to control the activation state of the headlights or for other applications in which photo-sensors are utilized. Although individual interior rearview mirror assemblies and exterior rearview mirror assemblies are illustrated, it should be understood that the interior and exterior reflective elements may be combined in a unitary system in which photo-sensors positioned at one of the assemblies may be utilized to establish reflective elements for all of the assemblies. This may be accomplished by utilizing a vehicle network, such as disclosed in commonly assigned U.S. Pat. Nos. 5,959,367 and 5,798,575; and in U.S. patent application Ser. No. 09/341,450, filed Jul. 8, 1999, by Drummond et al. for a VEHICLE REARVIEW MIRROR SYSTEM AND A VEHICLE CONTROL INCORPORATING SUCH MIRROR, the disclosures of which are hereby incorporated herein by reference.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A vehicle rearview mirror system, said rearview mirror system comprising:
   a rearview mirror assembly comprising an electro-optic reflective element;
   said mirror assembly comprising at least a first and a second photo-sensor, both facing generally in a common direction;
   said mirror assembly comprising a light piping element;
   said light piping element piping light to said first photo-sensor from a light environment different from the light environment to which said second photo-sensor is exposed;
   said first photo-sensor comprising a semiconductor photo-sensor sensitive both to visible light and to infrared radiation;
   a spectral filter disposed in front of said first photo-sensor to reduce the amount of infrared radiation incident at said first photo-sensor;
   said spectral filter comprising at least one chosen from:
      (a) a filter element having at least about 60% visible light transmission and having less than about 10% transmission in the near-infrared spectral region; and
      (b) an infrared attenuating dye in a polymer material.

2. The rearview mirror system in claim 1 wherein said first photo-sensor is chosen from the group comprising a photo-transistor, a photo-diode and a CMOS photo-sensor.

3. The rearview mirror system in claim 2 wherein said second photo-sensor is chosen from the group comprising a photo-transistor, a photo-diode and a CMOS photo-sensor.

4. The rearview mirror system in claim 3 wherein said light piping element comprises an optical plastic.

5. The rearview mirror system in claim 4 wherein said optical plastic comprises an acrylic.

6. The rearview mirror system in claim 1 wherein said mirror assembly comprises an interior rearview mirror assembly.

7. The rearview mirror system in claim 6 wherein said light piping element exposes said first photo-sensor to light passing through a vehicle windshield.

8. The rearview mirror system in claim 6 wherein said light piping element exposes said first photo-sensor to light from another vehicle approaching from the rear of the vehicle to which the interior rearview mirror is attached.

9. The rearview mirror system in claim 1 wherein said spectral filter comprises an infrared attenuating dye in a polymer material.

10. The rearview mirror system in claim 9 wherein said infrared attenuating dye is disposed in a light transmitting lens disposed in front of said first photo-sensor.

11. The rearview mirror system in claim 9 wherein said infrared attenuating dye is disposed in said light piping element.

12. The rearview mirror system in claim 9 wherein said infrared attenuating dye comprises an inorganic material.

13. The rearview mirror system in claim 12 wherein said inorganic material comprises a nickel complex.

14. The rearview mirror system in claim 1 wherein said first photo-sensor comprises a photo-transistor.

15. The rearview mirror system in claim 1 wherein said first photo-sensor comprises a photo-diode.

16. The rearview mirror system in claim 1 wherein said first photo-sensor and said second photo-sensor comprise a photo-transistor.

17. The rearview mirror system in claim 1 wherein said first photo-sensor and said second photo-sensor comprise a photo-diode.

18. The rearview mirror system in claim 1 wherein said spectral filter comprises a filter element having at least about 60% visible light transmission and having less than about 10% transmission in the near-infrared spectral region.

19. The rearview mirror system in claim 18 wherein said filter element comprises a near-infrared attenuating dye incorporated in an optical polymer.

20. The rearview mirror system in claim 19 wherein said optical polymer comprises at least one selected from the group consisting of a polycarbonate, an acrylic, a polystyrene, an acrylate, a polyester, CR39 and a COC polyolefin.

21. The rearview mirror system in claim 9 wherein said polymer material comprises a light-transmitting lens disposed in front of said first photo-sensor.

22. A vehicle rearview mirror system, said rearview mirror system comprising:
   an interior rearview mirror assembly comprising an electro-optic reflective element;

said mirror assembly comprising at least a first photo-sensor and a light piping element;

said light piping element piping light to said first photo-sensor;

said first photo-sensor comprising a semiconductor photo-sensor sensitive both to visible light and to infrared radiation;

said semiconductor photo-sensor comprising one of a photo-diode and a photo-transistor;

a spectral filter disposed in front of said first photo-sensor to reduce the amount of infrared radiation incident at said first photo-sensor;

said spectral filter comprising a filter element having at least about 60% visible light transmission and having less than about 10% transmission in the near-infrared spectral region;

said filter element comprising a near-infrared attenuating dye incorporated in an optical polymer; and wherein said optical polymer comprises at least one selected from the group consisting of a polycarbonate, an acrylic, a polystyrene, an acrylate, a polyester, CR39 and a COC polyolefin.

23. A vehicle rearview mirror system, said rearview mirror system comprising:

an interior rearview mirror assembly comprising an electro-optic reflective element;

said mirror assembly comprising at least a first photo-sensor and a light piping element;

said light piping element piping light to said first photo-sensor;

said first photo-sensor comprising a semiconductor photo-sensor sensitive both to visible light and to infrared radiation;

said semiconductor photo-sensor comprising one chosen from a photo-diode and a photo-transistor;

a spectral filter disposed in front of said first photo-sensor to reduce the amount of infrared radiation incident at said first photo-sensor;

said spectral filter comprising an infrared attenuating dye in a polymer material; and wherein said polymer material comprises a light-transmitting lens disposed in front of said first photo-sensor.

* * * * *

UNITED STATES PATENT AND TRADEMARK OFFICE
CERTIFICATE OF CORRECTION

PATENT NO. : 7,198,394 B2
APPLICATION NO. : 11/190182
DATED : April 3, 2007
INVENTOR(S) : Rodney K. Blank It is certified that error appears in the above-identified patent and that said Letters Patent is hereby corrected as shown below:

Column 2:
Line 25, "6,002,51" should be --6,002,511--.

Column 5:
Line 22, "6,002,51" should be --6,002,511--.

Column 7:
Line 20, "6,002,51" should be --6,002,511--.

Column 9:
Line 3, "6,002,51" should be --6,002,511--.

Signed and Sealed this

Twenty-seventh Day of May, 2008

JON W. DUDAS
*Director of the United States Patent and Trademark Office*